May 8, 1928.

E. F. OHLENDORF 1,669,140

BUMPER MECHANISM

Filed May 31, 1927

Inventor

E. F. Ohlendorf.

By Lacy & Lacy, Attorneys

May 8, 1928.

E. F. OHLENDORF 1,669,140

BUMPER MECHANISM

Filed May 31, 1927

Inventor

E. F. Ohlendorf.

By Lacey & Lacey, Attorneys

Patented May 8, 1928.

1,669,140

UNITED STATES PATENT OFFICE.

EMIL F. OHLENDORF, OF MOLINE, ILLINOIS.

BUMPER MECHANISM.

Application filed May 31, 1927. Serial No. 195,427.

This invention relates to impact shock absorbing means, as chiefly designed for motor vehicles, and provides a novel brake mechanism to be interposed between the bumper and the vehicle and unique connections whereby to admit of the bumper yielding at either end under impact without materially affecting the opposite end which simply pivots.

An essential feature of the invention is the disposition of the mechanism to allow ample clearance for the front wheels and obviate any possible interference with the snubbing devices in general use.

A further advantageous feature resides in firm joints free from rattle, and the location of the parts to prevent the wheels from throwing dirt thereon.

While the drawings illustrate a preferred embodiment of the invention it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 3 is a detail sectional view on the line 3—3 of Figure 2 looking in the direction of the arrows.

Figure 4 is a detail sectional view on the line 4—4 of Figure 3, looking in the direction of the arrows.

Figure 5 is a front view of the pressure lever, and an end view of the pin to which the lever is pivoted.

Figure 6 is a view similar to Figure 2 of a modification.

Figure 7 is a side view of the modification, the bumper bar being in section.

Corresponding and like parts are referred to in the following description and designated in the several views of the drawings by like reference characters.

Figure 1:
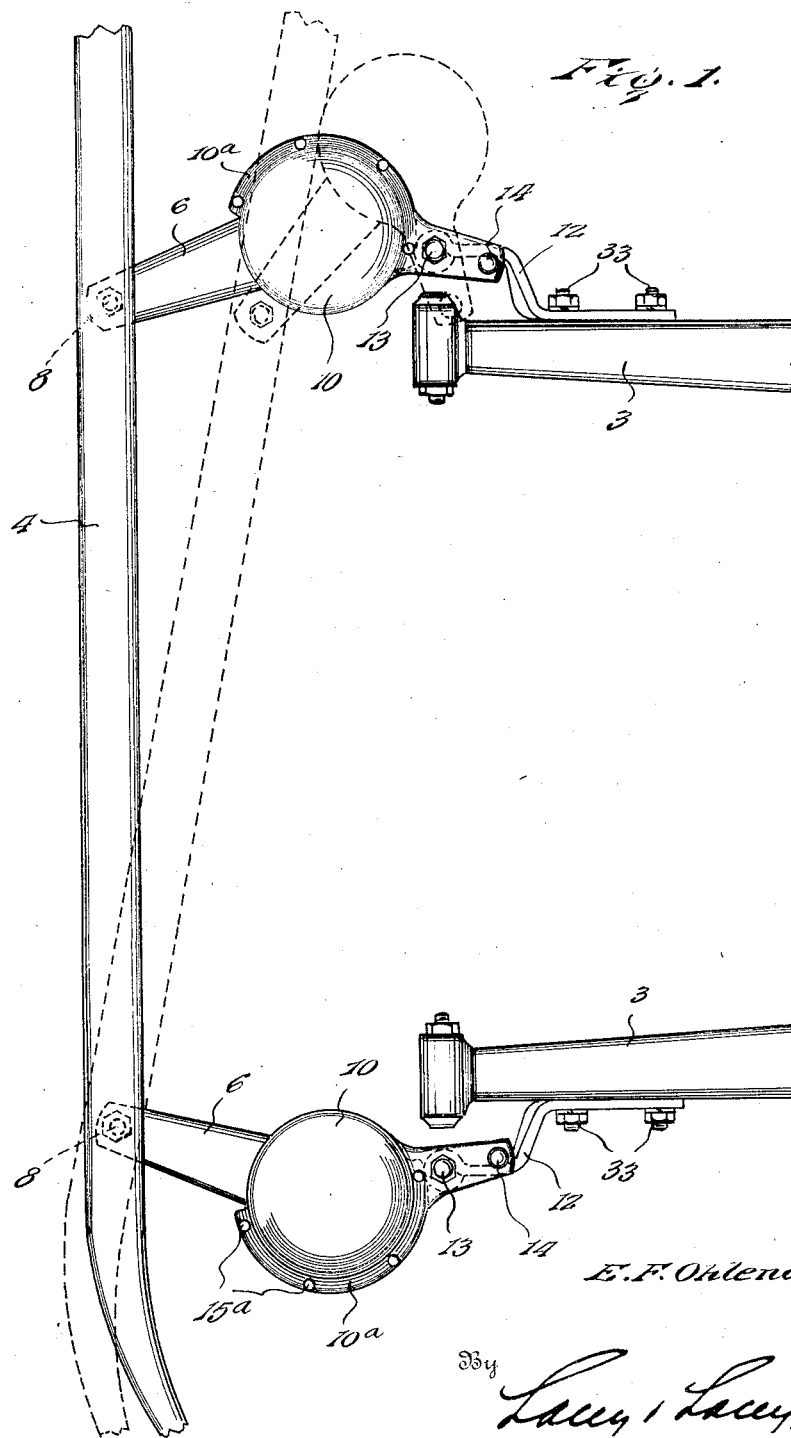
Figure 1 is a top plan view of the bumper mechanism embodying the invention, the dotted lines illustrating the position of the bumper when yielding to the impact of a blow delivered upon an end thereof.
Figure 2:
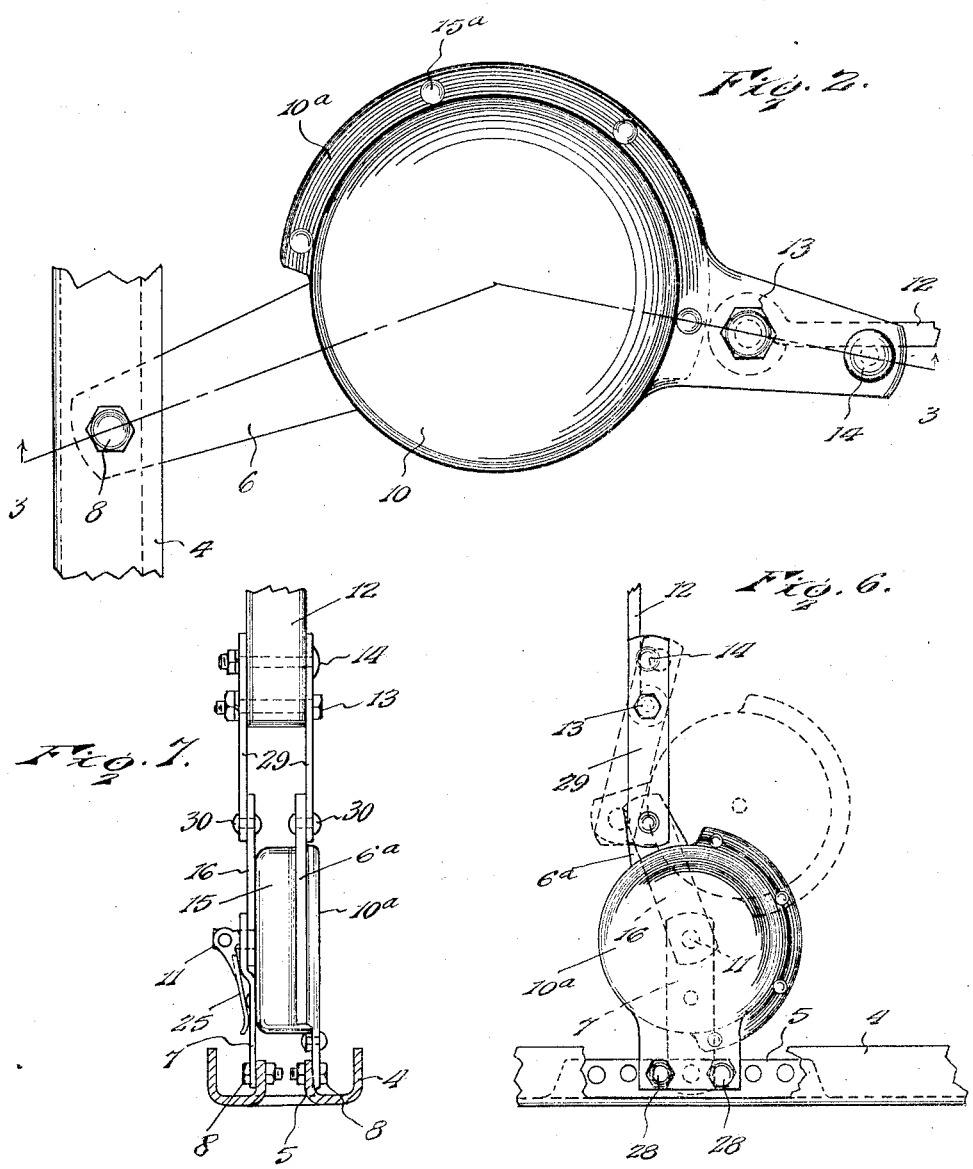
Figure 2 is a top plan view of the brake mechanism and part of the bumper bar and rear bracket, showing the parts on an enlarged scale.

The numeral 3 designates the side bars of the chassis of a motor vehicle, the same being illustrated to show supporting means for the mechanism. The bumper 4 may be of any construction and, as shown, is rigid and of channel formation. Portions are partly cut from the front portion of the bumper and are pressed rearwardly to provide a pair of lips or flanges 5 at each end of the bumper to which a friction plate 6 and link 7 are pivotally connected by means of bolts 8. The friction plate 6 is pivotally connected at its rear end to a supporting plate 10 by means of a cup 9 secured to said plate in any determinate way. The link 7 is pivotally connected at its rear to a pin 11 adjustably mounted upon the supporting plate 10. The supporting plate 10 is pivotally mounted on a bracket 12 connected to the vehicle frame and extends rearwardly of the pivot 13 and receives a bolt 14 which acts as a stop to limit the pivotal movement of the plate 10 carrying the brake mechanism in one direction about the pivot 13. The shell 15 housing the brake mechanism is riveted or otherwise fastened to the plate 10. On its underside the shell 15 has riveted to it the forward end of a link 16 through which the pivot 13 passes. The pivot 13 preferably consists of a bolt which is fitted to the front end of the bracket 12 or like part of the vehicle. This arrangement permits of a pivotal movement of the bumper bar 4 so that it may yield at one end under the impact of a blow delivered thereon and assume the position shown by the dotted lines in Figure 1. The plate 6 constitutes a brake member and is disposed between two friction rings 17 which are held in place by a retainer ring 18. Three U-shaped brackets 19 are welded, or fastened in any suitable manner, to the inside of the housing shell 15. A lever 20 is pivoted near its outer end to each of the brackets 19. The inner ends of the levers 20 engage a bushing 21 threaded upon the inner end of the pin 11. The bushing 21 and pin 11 have a limited axial movement. The bushing 21 is held from turning by means of studs 22 projecting outwardly therefrom and entering slots 23 formed in the sides of the cup 9. A lever 25 is pivotally connected at one end to the outer end of the pin 11 and is formed at the pivotal end with projections 25$^a$ to engage the link 16 and move the pin 11 and bushing 21 outwardly. The inner ends of the levers 20 engaging the bushing 21 move outwardly therewith which results in the retainer 18 being pressed inwardly, thereby clamping the member 6 between the elements 17. A recess 16$^a$ formed in the outer side of the link 16 receives the end of the lever 25 and prevents side movement thereof. The pivotal end of the lever 25 is forked and embraces the pin 11 to which it is pivoted by means of a pin 24. The inner or opposing ends of the links 7 and 16 overlap and the pin 11 passes loosely through the overlapped ends to admit of the parts turning without affecting the tension on the pin 11. The retainer 18 has three lips 18$^a$ which fit into recesses in the shell 15 to prevent the disc from rotating. The shell 15 has a flanged portion to permit holes for rivets 15$^a$ or to spot weld it to the extended portion 10$^a$ of the plate 10.

The internal friction or brake mechanism of the modification shown in Figures 6 and 7 is substantially the same as that shown in the other forms, the only difference being that the supporting plate, designated as 10$^b$, has an extended section that is bolted to the bumper 4 at 28.

The opposing ends of links 7 and 16 overlap and receive the projecting end of the pin 11 to which the lever 25 is pivoted in the manner hereinbefore stated. The link 7 is bolted to the bumper as at 8. The friction plate 6$^a$ is disposed between the shell 15 and plate 10$^b$ and an extension thereof is pivoted to a link 29, as indicated at 30. A companion link 29 is pivoted to the link 16. Both links 29 are pivoted to a bracket 12, at 13, and are limited in their pivotal movement in one direction by the stop bolt 14. The bracket 12 may be secured to the vehicle in any determinate way. By screwing the pin 11 in or out the pressure applied to the levers 20 may be regulated to vary the action of the friction, or brake mechanism.

When an obstruction is struck by the bumper bar 4 it forces the bar back, which in turn pivots the brake mechanism through the links 16, 7 and plates 6 and 10. In doing so the force of the impact is dissipated by the friction between the friction plate 6 and the friction discs or rings 17. The friction members or rings may be of any suitable material such as that now used for friction clutches. The friction members are held together or in contact by the pressure lever 25 which admits of instant application or release of the friction, or brake mechanism.

The pressure exerted through the lever 25 is augmented by the levers 20 to create sufficient resistance to the movement of the bumper when striking an object. When the lever 25 is moved to a position in line with the pin 11 the brake is released and when adjusted to a position at a right angle to the pin 11 the brake is set. The brackets 12 are fixed and the supporting plates 10 or 10$^b$ are pivoted thereto to swing laterally in one direction only from a normal position which, in the present instance, is outwardly, as shown by the dotted lines in Fig. 1. The stop bolts 14 limit the inward movement. The links 6 incline to the line of draft of the vehicle, hence turn when the bumper is struck. The bumper usually strikes at one end or to one side of its center, hence it yields at one end to the impact and pivots at the opposite end as shown most clearly in Figure 1 by the dotted lines.

Having thus described the invention, what I claim is:

1. A bumper mechanism comprising a link connection between the bumper and vehicle and pivoted to the latter, and a rotary brake mechanism in the length of the link connection and movable therewith and adapted to be actuated by the pivotal movement thereof.

2. A bumper mechanism comprising a link connection between the bumper and vehicle and pivoted to the latter and having a limited pivotal movement in one direction, and a rotary brake mechanism in the length of the link connection and movable therewith and adapted to be actuated by the pivotal movement thereof.

3. In combination with a vehicle and a bumper bar, of a link connection between each end of the bumper bar and the vehicle and pivoted to the latter and having a limited pivotal movement in one direction to admit of the bumper yielding at one end under impact and pivoted at the opposite end, and a rotary brake mechanism in the length of each of the link connections and movable therewith and adapted to offer resistance to the yielding movement of the bumper.

4. A bumper mechanism comprising a link connection between the bumper and vehicle and pivoted to the latter and inclined to the line of draft to break joint outwardly, and a rotary brake mechanism in the length of the link connection and movable therewith and adapted to be actuated by the pivotal movement thereof.

5. A bumper mechanism comprising a link and plate connection between the bumper and vehicle pivoted to each other and to the vehicle, and a rotary brake mechanism between the pivotal ends of the link and plate and adapted to be operated by the pivotal movement thereof.

6. A bumper mechanism comprising a link and plate connection between the bumper and vehicle pivoted to each other, a brake mechanism between the pivotal ends of the link and plate, a link between the bumper and brake mechanism, and means partly supported by the last mentioned link for tensioning the brake mechanism.

7. A bumper mechanism comprising a link and plate connection between the bumper and vehicle pivoted to each other, a brake mechanism between the pivotal ends of the link and plate, pivotally connected links between the bumper and vehicle, and brake tensioning means including a pin engaging the last mentioned links in line with their pivotal connection, and a lever pivoted to the outer end of the said pin.

8. A bumper mechanism comprising a link and plate connection between the bumper and vehicle pivoted to each other, a brake mechanism between the pivotal ends of the link and plate, brake tensioning levers, a manually operable pin for actuating the brake tensioning levers, and means cooperative with said pin for varying the action or releasing the said brake tensioning levers.

9. A bumper mechanism comprising a link and plate connection between the bumper and vehicle pivotally connected to each other, brake elements mounted on the plates and disposed on opposite sides of the links, a pressure member, levers having one end engaging the pressure member, a pin adjustably engaging the said levers, and a manually operable lever pivoted to the said pin and adapted to actuate or release the pressure exerted on the said levers.

10. A bumper mechanism comprising pivotally connected members between the bumper and vehicle, brake elements mounted upon one of the members upon opposite sides of the other member, pivoted links between the bumper and vehicle, pressure levers for the brake elements, an abutting element for the inner ends of the pressure levers, a pin adjustably engaging said abutting element and passing through the links in line with their pivotal connection, and a lever pivoted to the pin and adapted to operate said pressure levers.

11. A bumper mechanism comprising pivotally connected members between the bumper and vehicle, a cup carried by one of said members and loosely engaging the other member, brake elements at opposite sides of the last mentioned member, a housing shell, pivoted links between the bumper and vehicle, a pressure member, pressure levers mounted upon the housing shell, a bushing having sliding engagement with said cup, a pin threaded in the bushing and passing loosely through the shell and pivoted links, and an operating lever pivoted to the projecting end of the pin for moving it to create a pressure on the said levers or to release the pressure and the brake mechanism.

In testimony whereof I affix my signature.

EMIL F. OHLENDORF. [L. S.]